United States Patent
Wang (10) Patent No.: US 10,922,153 B2
(45) Date of Patent: Feb. 16, 2021

(54) COMMUNICATION METHOD AND DEVICE FOR VIRTUAL BASE STATIONS

(71) Applicant: Alcatel Lucent, Nozay (FR)

(72) Inventor: Cheng Wang, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/490,361

(22) PCT Filed: Mar. 6, 2018

(86) PCT No.: PCT/IB2018/000480
§ 371 (c)(1),
(2) Date: Aug. 30, 2019

(87) PCT Pub. No.: WO2018/162991
PCT Pub. Date: Sep. 13, 2018

(65) Prior Publication Data
US 2020/0073734 A1 Mar. 5, 2020

(30) Foreign Application Priority Data
Mar. 6, 2017 (CN) .......................... 2017 1 0129386

(51) Int. Cl.
| | |
|---|---|
| G06F 13/00 | (2006.01) |
| G06F 9/54 | (2006.01) |
| G06F 9/455 | (2018.01) |
| G06F 15/78 | (2006.01) |
| H04L 12/879 | (2013.01) |
| H04L 12/911 | (2013.01) |

(52) U.S. Cl.
CPC .............. *G06F 9/544* (2013.01); *G06F 9/455* (2013.01); *G06F 15/78* (2013.01); *H04L 49/901* (2013.01); *H04L 47/70* (2013.01)

(58) Field of Classification Search
CPC ....................................... G06F 9/544
USPC ....................................... 719/312
See application file for complete search history.

(56) References Cited

FOREIGN PATENT DOCUMENTS

| CN | 102 769 574 B | 4/2015 |
|---|---|---|
| EP | 2 487 982 B1 | 4/2015 |
| WO | WO 2015/014226 A1 | 2/2015 |

OTHER PUBLICATIONS

Z. Stamenkovic et al., "MAC and Baseband Hardware Platforms for RF-MIMO WLAN," 2010 5th European Conference on Circuits and Systems for Communications, IEEE, pp. 26-33, 2010.
International Search Report for PCT/IB2018/000480 dated Aug. 27, 2018.

*Primary Examiner* — Timothy A Mudrick
(74) *Attorney, Agent, or Firm* — Fay Sharpe LLP (57) ABSTRACT

Embodiments of the present disclosure relate to communication methods and devices for virtual base stations. For example, data is sequentially read and written between the hardware accelerator and the general purpose processor of the baseband processing unit at the baseband processing unit arranged with a plurality of virtual base stations, thereby achieving sharing of the traditional hardware accelerator among a plurality of virtual base stations without introducing virtualization layer or increasing hardware complexity.

15 Claims, 5 Drawing Sheets

COMMUNICATION METHOD AND DEVICE FOR VIRTUAL BASE STATIONS

FIELD

Embodiments of the present disclosure generally relate to communication technologies, and more specifically, to a communication method for virtual base stations and a corresponding device.

BACKGROUND

In recent years, the mobile communication industry evolves toward IT-isation and cloudization. The basic idea of Cloud Radio Access Network (C-RAN) and Network Function Virtualization (NFV) is to use a general purpose processor (GPP) to perform RAN and CN processing as much as possible. This can exploit the economies of scale of the IT industry and leverages standard IT virtualization technology, high-volume servers employed by the industry (for example, x86 architecture), switches and storage, to perform telecommunication network functions. These devices can be located in a data centre.

Taking RAN as an example, if a larger number of base station wireless stacks run in a resource pool (a data centre), it is easy to achieve data exchange among a plurality of eNBs in the resource pool, so as to facilitate cooperation among the base stations to eliminate interference and achieve performance gain.

The RAN processing in cloud can also bring pooling gain. In the cloud computing infrastructure, all eNBs are located in a same Baseband Unit (BBU) pool, which facilitates sharing of the processing power among eNBs, thereby allowing the operator to either reduce costs by provisioning fewer computing resources or reduce power consumption by turning the idle processors off. During idle hours, the eNBs on multiple machines/boards can be consolidated onto a small number of machines/boards and the idle machines can be shut down to save power. During busy hours, these eNBs can be migrated back to the newly started machines to guarantee overall system performance.

SUMMARY

In general, embodiments of the present disclosure propose a communication method for virtual base stations and a corresponding device.

In a first aspect, embodiments of the present disclosure provide a method implemented at a baseband processing unit having a plurality of virtual base stations arranged thereon. The method comprises: enabling a hardware accelerator in the baseband processing unit to process data to be transmitted in the plurality of virtual base stations, the processed data being stored in a first group of a plurality of buffers n the hardware accelerator which are associated with the plurality of virtual base stations; reading, from the first group of the plurality of buffers, the processed data in a predetermined order associated with the plurality of virtual base stations; and writing the processed data into a second group of a plurality of buffers in a general purpose processor of the baseband processing unit for further processing of the general purpose processor.

In a second aspect, embodiments of the present disclosure propose a method implemented at a baseband processing unit having a plurality of virtual base stations arranged thereon. The method comprises: enabling a general purpose processor in the baseband processing unit to process data to be transmitted in the plurality of virtual base stations, the processed data being stored in a first group of a plurality of buffers in the general purpose processor which are associated with the plurality of virtual base stations; reading, from the first group of the plurality of buffers, the processed data in a predetermined order associated with the plurality of virtual base stations; and writing the processed data into a second group of a plurality of buffers in a hardware accelerator of the baseband processing unit for further processing in the hardware accelerator.

In a third aspect, embodiments of the present disclosure provide a communication device having a plurality of virtual base stations arranged thereon. The communication device comprises: a hardware accelerator configured to process data to be transmitted in the plurality of virtual base stations, the processed data being stored in a first group of a plurality of buffers in the hardware accelerator which are associated with the plurality of virtual base stations; and a general purpose processor configured to: read, from the first group of the plurality of buffers, the processed data in a predetermined order associated with the plurality of virtual base stations; and write the processed data into a second group of a plurality of buffers in the general purpose processor for further processing.

In a fourth aspect, embodiments of the present disclosure provide a communication device having a plurality of virtual base stations arranged thereon. The communication device comprises: a hardware accelerator; a general purpose processor configured to: process data to be transmitted in the plurality of virtual base stations, the processed data being stored in a first group of a plurality of buffers in the general purpose processor which are associated with the plurality of virtual base stations; read, from the first group of the plurality of buffers, the processed data in a predetermined order associated with the plurality of virtual base stations; and write the processed data into a second group of a plurality of buffers in the hardware accelerator for further processing in the hardware accelerator.

Through the following description, it will be understood that according to embodiments of the present disclosure, a plurality of virtual base stations can achieve sharing Peripheral Component Interface Express (PCIe), thereby reducing hardware complexity and simplifying development of PCIe device drivers. According to embodiments of the present disclosure, virtualization overheads are not required. According to embodiments of the present disclosure, conflicts between different virtual base stations upon accessing the PCIe device can be avoided, so as to acquire higher I/O throughput. According to embodiments of the present disclose, the I/O bandwidth among a plurality of virtual base stations can be dynamically reallocated.

It should be appreciated that the contents described in this Summary are not intended to identify key or essential features of embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, same or similar reference signs indicate the same or similar elements, wherein.

DETAILED DESCRIPTION OF EMBODIMENTS

Embodiments of the present disclosure will be described in more details with reference to the drawings. Although the drawings illustrate some embodiments of the present disclosure, it should be appreciated that the present disclosure can be implemented in various manners and should not be limited to the embodiments explained herein. On the contrary, the embodiments are provided to understand the present disclosure in a more thorough and complete way. It should be appreciated that drawings and embodiments of the present disclosure are only for example purposes rather than restricting the protection scope of the present disclosure.

As used herein, the term "network device" refers to entities or nodes having a particular function in a base station or a communication network. The term "base station" (BS) can represent a node B (NodeB or NB), an evolution node B (eNode B or eNB), a remote radio unit (RRU), a radio frequency head (RH), a remote radio head (RRH), a relay, or low power nodes, such as pico base station or femto base station and so on. In the context of the present disclosure, the terms "network device" and "base station" are used interchangeably for the sake of discussion and eNB serves as a main example of the network device.

As used herein, the term "terminal device" or "user equipment" (UE) refers to any terminal devices that can wirelessly communicate with the base stations or with each other. For example, the terminal device can include a mobile terminal (MT), a subscriber station (SS), a portable subscriber station (PSS), a mobile station (MS) or an access terminal (AT), the above devices mounted on vehicles, MTC devices and the like. In the context of the present disclosure, the terms "terminal device" and "user equipment" can be used interchangeably for the sake of discussion.

In the context of the present disclosure, the terms "Field Programmable Gate Array (FPGA)," "Peripheral Component Interface Express (PCIe)" and "accelerator" can be used interchangeably for the sake of discussion.

The term "include" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Definitions related to other terms will be described in the following description.

In recent years general purpose processor (GPP) has developed rapidly. New features, such as multi-CPU/multi-core, Single-Instruction Multiple Data (SIMD) and large on-chip caches, make it possible to afford multiple wireless stacks on a single GPP server. One advantage of GPPs is that they are backward compatible, which ensures that software can run on a new generation of processor without any change and is beneficial for smooth upgrade of the wireless stacks. Another advantage of GPPs is their well support of virtualization technology. There are many virtualization products on the market such as Linux Container, VMware, KVM and Xen. Virtualization technology allows multiple virtual machines (VM) concurrently running on the same physical machine. That is, the virtual base stations are isolated from each other and multi-standards operations are easily supported by virtualization on the open platform.

As FPGA has a higher performance in terms of unit energy consumption, the combination of the general purpose processor and FPGA can achieve a higher performance, lower power consumption and better compatibility. In a practical system, the computation-intensive physical layer processing can be performed by FPGAs, and MAC layers and the like can be completed by the general purpose processor. The following text will provide detailed explanation in this regard.

The conventional FPGA chip can support physical layer processing up to 6 LTE cells and one x86 CPU core can handle MAC layer processing of two cells. Thus, one x86 server with multiple CPU cores and with one FPGA card can support wireless stacks of multiple cells. With more FPGA-PCIe cards plugged, more cells can be supported by a single server.

It should be noted that although embodiments of the present disclosure provide explanation mainly with reference to FPGAs, it should be understood that this is only exemplary and is not intended for limiting the scope of the present disclosure in any manners. Any devices having identical or similar processing features with FPGAs can replace the FPGA or combine with FPGAs to implement embodiments of the present disclosure. In the embodiments of the present disclosure, these devices can be referred to as "hardware accelerators."

Besides, it should also be noted that although embodiments of the present disclosure are mainly implemented in the Linux container environment, it is only an example and is not intended for limiting the scope of the present disclosure in any manners. Any components being identical or similar with the Linux container can replace the Linux container or combine with the Linux container to implement embodiments of the present disclosure.

As the PCIe-based FPGA can afford physical layer processing of multiple base stations, and there are a limited number of PCIe slots on the motherboard, it is necessary to share the PCIe-based FPGA among multiple virtual base stations.

In conventional technologies, Hypervisor enables the virtual machines to share a device in a software manner. In order to improve the I/O performance of the PCIe device, Single-Root I/O Virtualization (SR-IOV) technology was proposed to avoid Hypervisor's involvement in data movement by providing independent memory space, interrupts, and Direct Memory Access (DMA) streams for each virtual machine. SR-IOV architecture is designed to allow an I/O device to support multiple virtual functions, which are more complex than a traditional PCIe device. To enable to be accessed by multiple virtual machines, the PCIe device must support SR-IOV, which increases hardware costs. SR-IOV also can impact Hypervisor and the PCIe driver in a virtual machine. Another critical problem with SR-IOV is that the resource sharing assigned to a virtual machine is static. The I/O capability of an underutilized PCIe virtual function in a virtual machine cannot be shared by other overloaded virtual machine. This conflicts with cloud idea which encourages resource sharing among tenants.

To at least partially solve the above and potential problems, embodiments of the present disclosure relate to sharing the PCIe devices for PHY processing in a highly efficient way for a plurality of virtual base stations. According to embodiments of the present disclosure, the PCIe device does not need to support SR-IOV, which eliminates the overheads introduced by Hypervisor, improves the PHY real-time performance, and reduces the complexity and costs of the PCIe card.

In recent years, a novel lightweight virtualization technique named Linux container is developed. The Linux Container allows Linux system to run multiple isolated virtual systems using a single Linux core on a single server. It can offer isolation from a container to the host and all other containers. The Linux container can achieve the same real-time performance as the native Linux system, which is very important for wireless network baseband signal processing and can be applied into Cloud RAN and 5G networks. Only as examples, some embodiments according to the present disclosure employ the Linux container technique.

Figure 1:
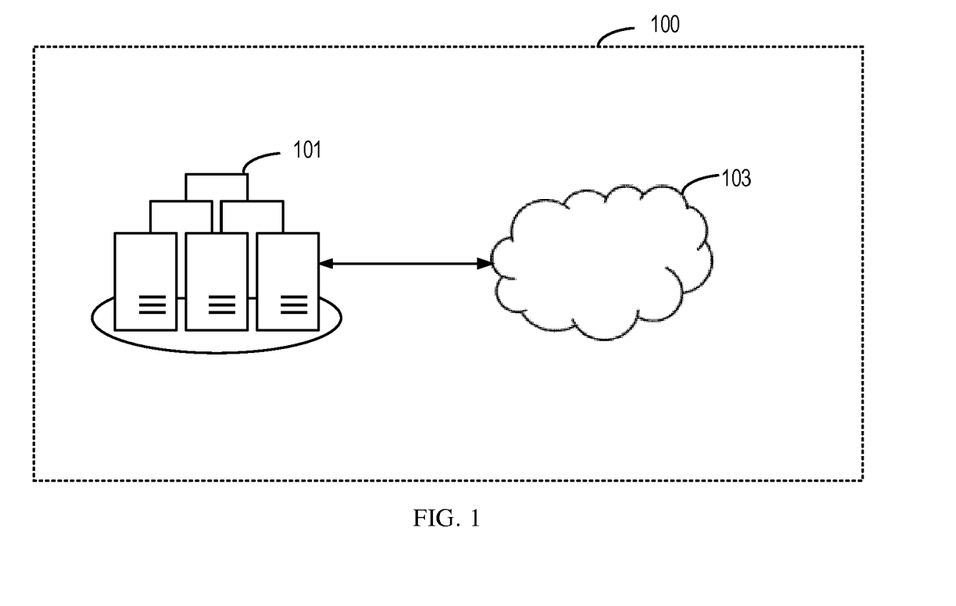
FIG. 1 illustrates an example communication network in which embodiments of the present disclosure can be implemented.

FIG. 1 illustrates an example communication network 100 in which embodiments of the present disclosure can be implemented. The communication network 100 includes a baseband processing unit 101 and a core network 103. The baseband processing unit 101 and the core network 103 can transmit data with each other. A plurality of virtual base stations (not shown) can be arranged on the baseband processing unit 101. It should be appreciated that the number of the processing unit 101 and the core network 103 shown in FIG. 1 is only for the purpose of illustration and is not intended for restriction.

Figure 2A:
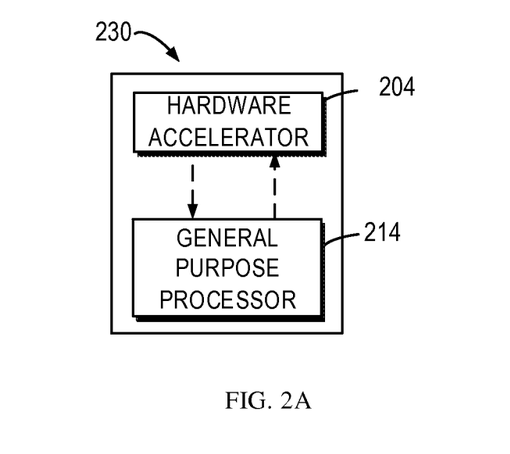
FIG. 2A illustrates a device diagram according to embodiments of the present disclosure.

FIG. 2A illustrates a device 230 according to embodiments of the present disclosure. According to embodiments of the present disclosure, the communication device 230 can be implemented at the baseband processing unit 101 shown in FIG. 1. The communication device 230 includes a hardware accelerator 204 and a general purpose processor 214, and data is exchanged between the hardware accelerator 204 and the general purpose processor 214. It should be understood that although FIG. 2A only illustrates one hardware accelerator 204 and one general purpose processor 214, the shown number is only for the purpose of illustration and is not intended for restriction.

Figure 2B:
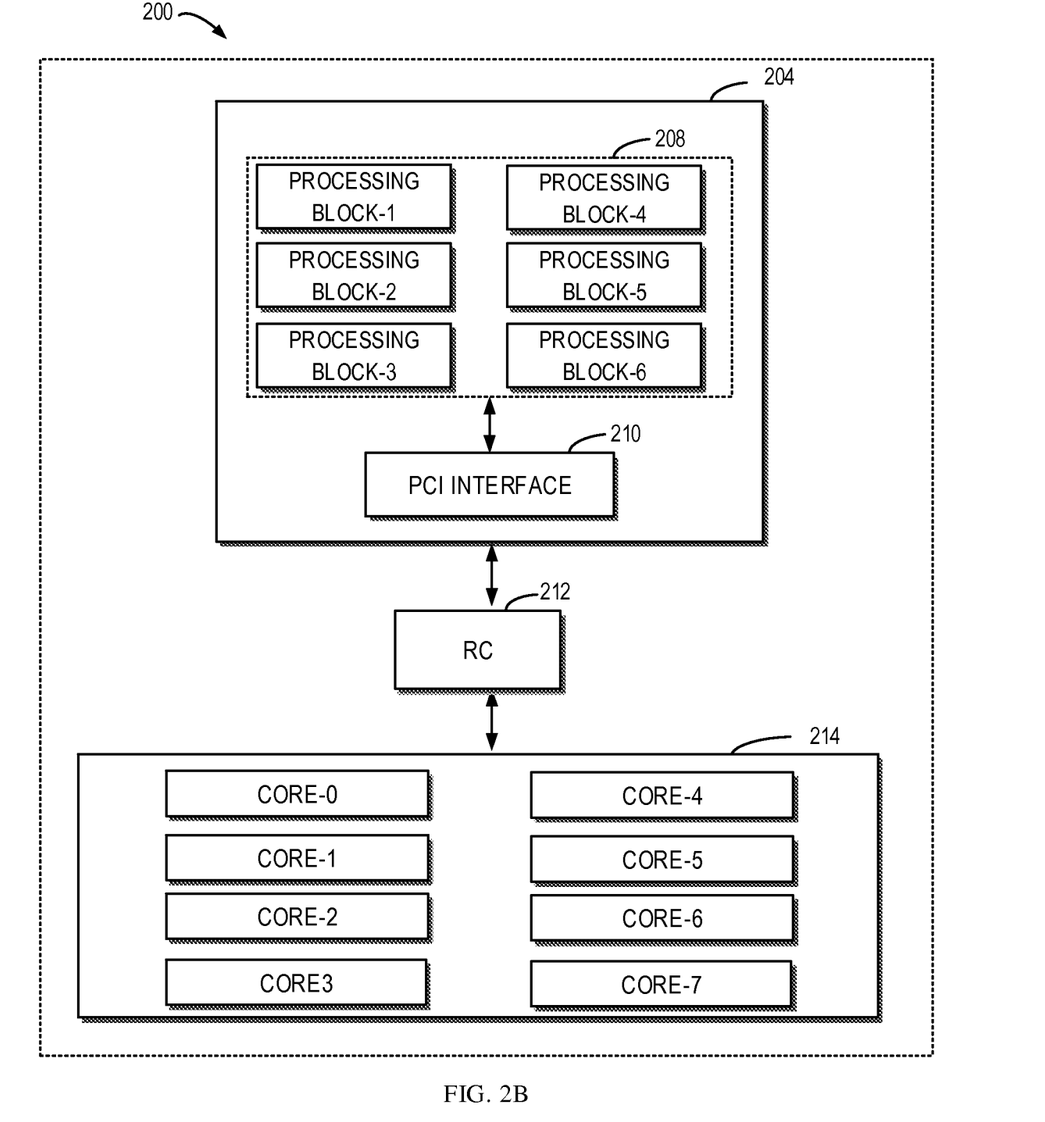
FIG. 2B illustrates a block diagram of processing architecture based on a hardware accelerator and a general purpose processor according to embodiments of the present disclosure.

FIG. 2B illustrates a block diagram 200 of processing architecture based on the hardware accelerator and the general purpose processor. According to embodiments of the present disclosure, the processing architecture shown in FIG. 2B can be implemented at the baseband processing unit 101 shown in FIG. 1. The architecture 200 includes the hardware accelerator 204 and the general purpose processor 214. It should be appreciated that although FIG. 2B only illustrates one hardware accelerator 204 and one general purpose processor 214, the shown number is only for the purpose of illustrations and is not intended for restriction. The architecture 200 also can include a radio frequency module (not shown), which can communicate with the core network (not shown) via the hardware accelerator 204 and the general purpose processor 214. The baseband processing unit 101 shown in FIG. 1 can include any appropriate number hardware accelerators 204 and general purpose processors 214. Each general purpose processor can have any appropriate number of cores, and each core can have any appropriate number of threads. In the example in FIG. 2B, it only illustrates one general purpose processor 214 including 8 cores, i.e., core-0 to core-7, for the purpose of simplification.

Besides, the hardware accelerator 204 is connected with a Root Complex (RC) via a PCI Express (PCIe) interface 210. The hardware accelerator 204 also can be connected with the radio frequency module (not shown) via an NGFI interface (not shown). All or partial processing of the uplink and downlink physical layer processing can be completed in the hardware accelerator 204.

The hardware accelerator 204 also can comprise a plurality of processing blocks 208. FIG. 2B illustrates 6 processing blocks. In some embodiments, one processing block can be one module or unit in the hardware accelerator 204 or other devices. As described above, the hardware accelerator 204 can support physical layer processing of six virtual base stations, so the hardware accelerator 204 can be divided into six processing blocks, i.e., processing block 1 to processing block 6, and each processing block handles processing of one virtual base station. It should be appreciated that the number is only for the purpose of illustration and is not intended for restriction and the hardware accelerator 204 can be divided into any appropriate number of processing blocks. It should be understood that the processing block is divided logically rather than physically. In some embodiments, the hardware accelerator can be FPGA.

Principle and specific embodiments of the present disclosure will be explained in details respectively from the perspective of uplink and downlink with reference to FIGS. 3 to 5. In embodiments of the present disclosure, uplink refers to a link from the hardware accelerator to the general purpose processor and downlink refers to a link from the general purpose processor to the hardware accelerator. It should be understood that the definition of uplink and downlink is only for the purpose of description and shall not restrict contents of the present disclosure in any manner in the embodiments of the present disclosure.

Figure 3:
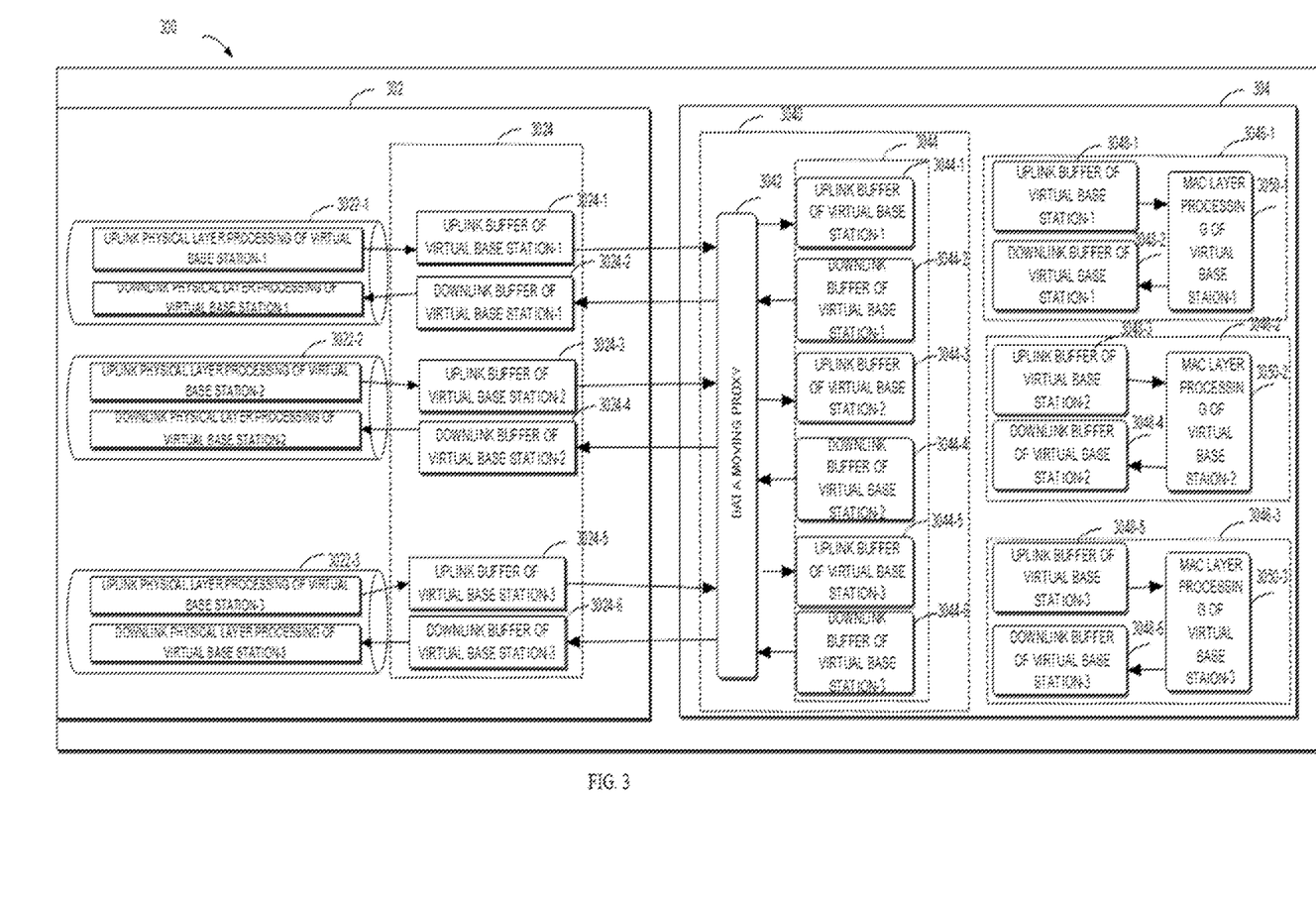
FIG. 3 illustrates a block diagram of a hardware accelerator and a general purpose processor according to embodiments of the present disclosure.

Only as an example, FIG. 3 is a block diagram 300 of a hardware accelerator and a general purpose processor according to embodiments of the present disclosure. The block diagram 300 includes a hardware accelerator 302 and a general purpose processor 304. The hardware accelerator 302 includes modules (for example, 3022-1, 3022-2, 3022-3) for performing physical layer processing on data of the virtual base station. For example, the physical layer processing module 3022-1 is for uplink and downlink physical layer processing of the virtual base station-1; the physical layer processing module 3022-2 is for uplink and downlink physical layer processing of the virtual base station-2; and the physical layer processing module 3022-3 is for uplink and downlink physical layer processing of the virtual base station-3. The hardware processor 302 is divided into a plurality of physical layer processing modules (for example, 3022-1, 3022-2, 3022-3) on logic level. The hardware accelerator 302 also includes a first group of a plurality of buffers 3024 for buffering data performed with physical layer processing and/or for buffering data to be performed with physical layer processing. A first buffer 3024-1 in the first group of the plurality of buffers 3024 is an uplink buffer of the virtual base station-1. That is, it is used for buffering data that is processed by the physical layer processing module 3022-1 of the virtual base station-1 and to be transmitted to the general purpose processor 304. A second buffer 3024-2 in the first group of the plurality of buffers 3024 is a downlink buffer of the virtual base station-1. That is, it is used for buffering data that is processed by the general purpose processor and to be transmitted to the physical layer processing module 3022-1 of the virtual base station-1 for further processing. Similarly, a third buffer 3024-3 in the first group of the plurality of buffers 3024 is an uplink buffer of the virtual base station-2. That is, it is used for buffering data that is processed by the physical layer processing module 3022-2 of the virtual base station-2 and to be transmitted to the general purpose processor 304. A fourth buffer 3024-2 in the first group of the plurality of buffers 3024 is a downlink buffer of the virtual base station-2. That is, it is used for buffering data that is processed by the general purpose process and to be transmitted to the physical layer processing module 3022-2 of the virtual base station-2 for further processing. A fifth buffer 3024-5 of the first group of the plurality of buffers 3024 is an uplink buffer of the virtual base station-3. That is, it is used for buffering data that is processed by the physical layer processing module 3022-5 of the virtual base station-3 and to be transmitted to the general purpose processor 304. A sixth buffer 3024-6 of the first group of the plurality of buffers 3024 is a downlink buffer of the virtual base station-3. That is, it is used for buffering data that is processed by the general purpose processor and to be transmitted to the physical processing layer module 3022-3 of the virtual base station-3 for further processing. It should be appreciated that the number of physical layer processing modules in the hardware accelerator 302 and the number of buffers in the first group of a plurality of buffers shown in FIG. 3 are only for the purpose of illustration and are not intended for restriction. The hardware accelerator 302 can include any appropriate number of physical layer processing modules and the first group of a plurality of buffers.

The general purpose processor 304 shown in FIG. 3 includes a local operating system 3040. A data moving proxy 3042 and a second group of a plurality of buffers 3044 are implemented in the local operating system 3040. The data moving proxy 3042 is configured to move data between the hardware accelerator 302 and the general purpose processor 304. Example operations of the data moving proxy 3042 will be explained in details in the following text with reference to FIGS. 4 and 5. The second group of the plurality of buffers 3044 is used for buffering data to be performed with MAC layer processing and/or for buffering data performed with MAC layer processing. A first buffer 3044-1 of the second group of the plurality of buffers 3044 is an uplink buffer of the virtual base station-1. That is, it is used for buffering data that is processed by the hardware accelerator 302 and to be performed with MAC layer processing. A second buffer 3044-2 of the second group of the plurality of buffers 3044 is a downlink buffer of the virtual base station-1. That is, it is used for buffering data that is performed with MAC layer processing and to be transmitted to the hardware accelerator 302. Similarly, a third buffer 3044-3 of the second group of the plurality of buffers 3044 is an uplink buffer of the virtual base station-2. That is, it is used for buffering data that is processed by the hardware accelerator 302 and to be performed with MAC layer processing. A fourth buffer 3044-4 of the second group of the plurality of buffers 3044 is a downlink buffer of the virtual base station-2. That is, it is used for buffering data that is performed with MAC layer process and to be transmitted to the hardware accelerator 302. A fifth buffer 3044-5 of the second group of the plurality of buffers 3044 is an uplink buffer of the virtual base station-3. That is, it is used for buffering data that is processed by the hardware accelerator 302 and to be performed with MAC layer processing. A sixth buffer 3044-6 of the second group of the plurality of buffers 3044 is a downlink buffer of the virtual base station-3. That is, it is used for buffering data that is performed with MAC layer processing and to be transmitted to the hardware accelerator 302.

Only as an example, the general purpose processor 304 also includes Linux containers (3046-1, 3046-2, 3046-3). Each Linux container corresponds to one virtual base station, i.e., the Linux container 3046-1 corresponding to the virtual base station-1, the Linux container 3046-2 corresponding to the virtual base station-2 and the Linux container 3046-3 corresponding to the virtual base station-3. The Linux container 3046-1 includes an uplink buffer 3048-1 of the virtual base station-1, a downlink buffer 3048-2 of the virtual base station-1 and an MAC layer processing module 3050-1 of the virtual base station-1. The uplink buffer and downlink buffer in the Linux container and the corresponding uplink buffer and downlink buffer in the local operating system are mapped to the same physical memory segment. That is, the uplink buffer 3044-1 of the virtual base station-1 in the local operating system and the uplink buffer 3048-1 of the virtual base station-1 in the Linux container 3046-1 are mapped to the same physical memory segment. Similarly, the downlink buffer 3044-2 of the virtual base station-1 in the local operating system 3040 and the downlink buffer 3048-2 of the virtual base station-1 in the Linux container 3046-1 are mapped to the same physical memory segment. The uplink buffer 3044-3 of the virtual base station-2 in the local operating system 3040 and the uplink buffer 3048-3 of the virtual base station-2 in the Linux container 3046-2 are mapped to the same physical memory segment. The downlink buffer 3044-4 of the virtual base station-2 in the local operating system 3040 and the downlink buffer 3048-4 of the virtual base station-2 in the Linux container 3046-2 are mapped to the same physical memory segment. The uplink buffer 3044-5 of the virtual base station-3 in the local operating system 3040 and the uplink buffer 3048-5 of the virtual base station-3 in the Linux container 3046-3 are mapped to the same physical memory segment. The downlink buffer 3044-6 of the virtual base station-3 in the local operating system 3050 and the downlink buffer 3048-6 of the virtual base station-3 in the Linux container 3046-3 are mapped to same physical memory segment. Therefore, it achieves internal storage sharing among the Linux containers.

It should be understood that the numbers of buffers in the second group of the plurality of buffers and the number of Linux containers shown in FIG. 3 are only examples. The general purpose processor 304 can include any appropriate number of the second group of the plurality of buffers and Linux containers.

Figure 4:
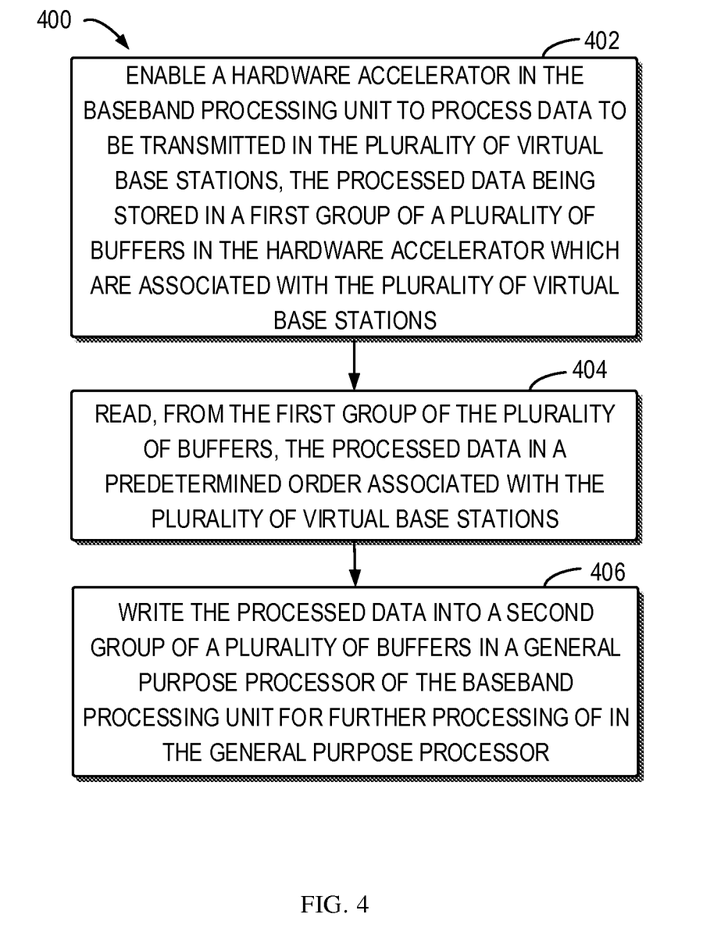
FIG. 4 illustrates a flowchart of a communication method according to embodiments of the present disclosure.

A communication method according to embodiments of the present disclosure is now described in details with reference to FIGS. 3 and 4. FIG. 4 illustrates a flowchart of a communication method 400 according to embodiments of the present disclosure. The communication method 400 as shown in FIG. 4 can be implemented at the device 230 shown in FIG. 2A.

At 402, the hardware accelerator 302 in the baseband processing unit 101 processes data to be transmitted of a plurality of virtual base stations, and the processed data is stored in a first group of the plurality of buffers 3024 associated with the virtual base station in the hardware accelerator 302. In some embodiments, the hardware accelerator 302 performs physical layer processing on the data to be transmitted. In some embodiments, performing physical layer processing on the data to be transmitted includes performing computation-intensive processing in the physical layer processing link on the data to be transmitted.

At 404, the processed data is read from the first group of the plurality of buffers 3024 in a predetermined sequence associated with a plurality of virtual base stations. In some embodiments, the processed data is read from the first group of buffers 3024 in a pooling manner. Only as an example, with reference to FIG. 3, the data moving proxy 3042 shown in FIG. 3 is running on the local operating system 3040. The data moving proxy 3042 moves data between the hardware accelerator 302 and the general purpose processor 304. The data moving proxy 3042 is the unique course that can access the hardware accelerator 302. In some embodiments, the data moving proxy 3042 can periodically read data from the uplink buffer (for example, 3024-1, 3024-3, 3024-5) of the hard accelerator 302 according to a predetermined order. Those skilled in the art can understand that the predetermined order can any appropriate predetermined order, and embodiments of the present disclosure are not limited in this regard. In some embodiments, the data moving proxy 3042 can regularly check read one by one according to the predetermined order, whether the uplink buffer (for example, 3024-1, 3024-3, 3024-5) in the hardware accelerator 302 contains data that needs to be, so as to implement reading data from the first group of buffers 3024 in a pooling manner. In some embodiments, the data moving proxy 3042 can check a flag set in the uplink buffer (for example, 3024-1, 3024-3, 3024-5) of the first group of buffers 3024 to determine whether there is data needs to be read.

In some embodiments, reading the processed data from the first group of the plurality of buffers 3024 in a predetermined order associated with the plurality of virtual base stations includes: reading data in a first buffer of the first group of a plurality of buffers 3024; and in response to all data in the first buffer having been read, initiating to read data from a second buffer of the first group of a plurality of buffers. The first buffer is preceded to the second buffer in the predetermined order. With reference to FIG. 3, only as an example, assuming that the uplink buffer 3024-1 of the virtual base station-1 in the first group of a plurality of buffers 3024 precedes the uplink buffer 3024-3 of the virtual base station-2 in the predetermined order, the data moving proxy 3042 may read data from the uplink buffer 3024-1 of the virtual base station-1. After all data in the uplink buffer 3024-1 of the virtual base station-1 has been read, the data moving proxy 3042 starts to read data from the uplink buffer 3024-3 of the virtual base station-2.

In some embodiments, reading the processed data from the first group of the plurality of buffers 3024 in a predetermined order associated with the plurality of virtual base stations includes: reading a predetermined amount of data from a third buffer of the first group of the plurality of buffers 3024; and in response to the predetermined amount of data in the third buffer having been read, initiating to read data from a fourth buffer of the first group of a plurality of buffers. The third buffer is preceded to the fourth buffer in the predetermined sequence. With reference to FIG. 3, only as an example, assuming that the uplink buffer 3024-1 of the virtual base station-1 in the first group of a plurality of buffers precedes the uplink buffer 3024-3 of the virtual base station-2 in the predetermined sequence, the data moving proxy 3042 may read data from the uplink buffer 3024-1 of the virtual base station-1; after the predetermined amount of data in the uplink buffer 3024-1 of the virtual base station-1 has been read, the data moving proxy 3042 starts to read data from the uplink buffer 3024-3 of the virtual base station-2.

At 406, the processed data is written into a second group of the plurality of buffers 3044 in the general purpose processor 304 of the baseband processing unit 101 for further processing of the general purpose processor 304. In some embodiments, the general purpose processor 304 further performs Media Access Control MAC layer processing on the processed data. With reference to FIG. 3, only as an example, the data moving proxy 3042 may write data read from the first group of the plurality of buffers 3024 of the hardware accelerator 302 into the second group of the plurality of buffers 3044 of the general purpose processor 304. Only as an example, the data moving proxy 3042 may write data read from the uplink buffer 3024-1 of the virtual base station-1 in the first group of the plurality of buffers 3024 into the uplink buffer 3044-1 of the virtual base station-1 in the second group of the plurality of buffers 3044. Similarly, the data moving proxy 3042 may write data read from the uplink buffer 3024-3 of the virtual base station-2 in the first group of the plurality of buffers 3024 into the uplink buffer 3044-3 of the virtual base station-2 in the second group of the plurality of buffers 3044. The data moving proxy 3042 may write data read from the uplink buffer 3024-5 of the virtual base station-3 in the first group of the plurality of buffers 3024 into the uplink buffer 3044-5 of the virtual base station-3 in the second group of the plurality of buffers 3044. As described above, in some embodiments, the second group of the plurality of buffers 3044 and the buffers (e.g., 3048-1, 3048-3, 3048-5) of the corresponding Linux containers are mapped into the same physical memory segment. The Linux containers can read data directly from the physical memory segment for MAC layer processing.

Figure 5:
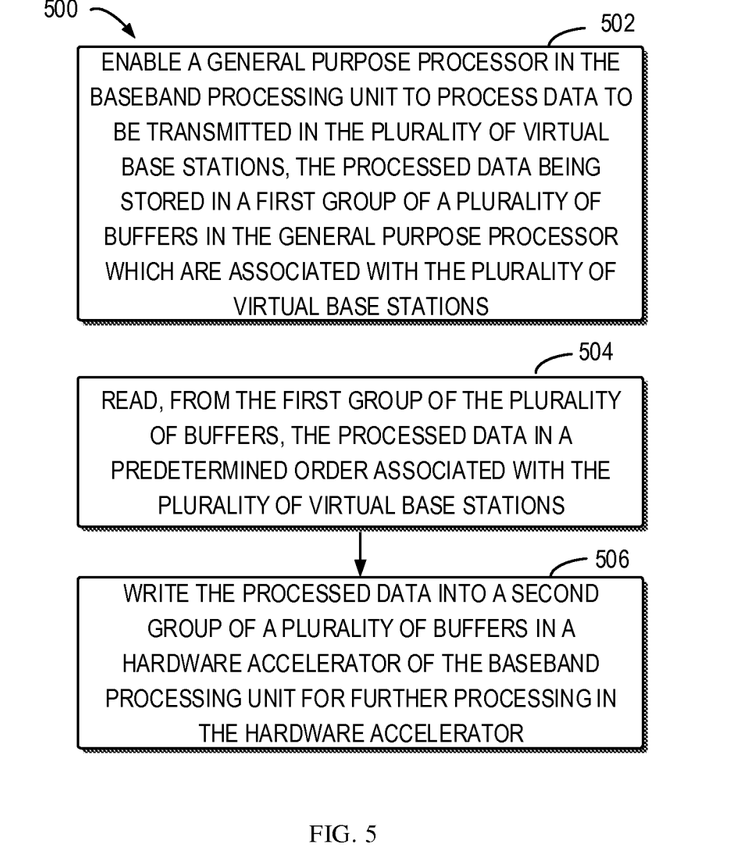
FIG. 5 illustrates a flowchart of a communication method according to embodiments of the present disclosure.

A communication method according to embodiments of the present disclosure is now described in details with reference to FIGS. 3 and 5. FIG. 5 illustrates a flowchart of a communication method 500 according to embodiments of the present disclosure. The communication method 500 as shown in FIG. 5 can be implemented at the device 230 shown in FIG. 2A.

At 502, the general purpose processor 304 in the baseband processing unit 101 processes data to be transmitted of a plurality of virtual base stations, and the processed data is stored in a first group of the plurality of buffers 3024 associated with the virtual base station in the general purpose processor 304. In some embodiments, the general purpose processor 304 performs Media Access Control MAC layer processing on the data to be transmitted.

At 504, the processed data is read from the first group of the plurality of buffers 3044 in a predetermined sequence associated with a plurality of virtual base stations. In some embodiments, the processed data is read from the first group of buffers 3044 in a pooling manner. Only as an example, with reference to FIG. 3, the data moving proxy 3042 shown in FIG. 3 is running on the local operating system 3040. The data moving proxy 3042 moves data between the hardware accelerator 302 and the general purpose processor 304. The data moving proxy 3042 is the unique course that can access the hardware accelerator 302. In some embodiments, the data moving proxy 3042 can periodically read data from the downlink buffer (for example, 3044-2, 3044-4, 3044-6) of the general purpose processor 304 according to a predetermined order. Those skilled in the art can understand that the predetermined order can any appropriate predetermined order, and embodiments of the present disclosure are not limited in this regard. In some embodiments, the data moving proxy 3042 can regularly check one by one, according to the predetermined sequence, whether the downlink buffer (for example, 3044-2, 3044-4, 3044-6) of the general purpose processor 304 contains data that needs to be read, so as to implement reading data from the first group of buffers 3044 in a pooling manner. In some embodiments, the data moving proxy 3042 can check a flag set in the downlink buffer (for example, 3044-2, 3044-4, 3044-6) of the first group of buffers 3044 to determine whether there is data needs to be read.

In some embodiments, reading the processed data from the first group of the plurality of buffers 3044 in a predetermined order associated with the plurality of virtual base stations includes: reading data in a first buffer of the first group of the plurality of buffers 3044; and in response to all data in the first buffer having been read, initiating to read data from a second buffer of the first group of the plurality of buffers. The first buffer is preceded to the second buffer in the predetermined order. With reference to FIG. 3, only as an example, assuming that the downlink buffer 3044-2 of the virtual base station-1 in the first group of a plurality of buffers 3044 precedes the downlink buffer 3044-4 of the virtual base station-2 in the predetermined order, the data moving proxy 3042 may read data from the downlink buffer 3044-2 of the virtual base station-1; after all data in the downlink buffer 3044-2 of the virtual base station-1 has been read, the data moving proxy 3042 starts to read data from the downlink buffer 3044-4 of the virtual base station-2.

In some embodiments, reading the processed data from the first group of a plurality of buffers 3044 in a predetermined order associated with the plurality of virtual base stations includes: reading a predetermined amount of data from a third buffer of the first group of a plurality of buffers 3044; and in response to the predetermined amount of data in the third buffer having been read, initiating to read data from a fourth buffer of the first group of the plurality of buffers. The third buffer is preceded to the fourth buffer in the predetermined sequence. With reference to FIG. 3, only as an example, assuming that the downlink buffer 3044-2 of the virtual base station-1 in the first group of a plurality of buffers 3044 precedes the downlink buffer 3044-4 of the virtual base station-2 in the predetermined sequence, the data moving proxy 3042 may read data from the downlink buffer 3044-2 of the virtual base station-1; after the predetermined amount of data in the downlink buffer 3044-2 of the virtual base station-1 has been read, the data moving proxy 3042 starts to read data from the downlink buffer 3044-4 of the virtual base station-2.

At 506, the processed data is written into a second group of the plurality of buffers 3042 in the hardware accelerator 302 of the baseband processing unit 101, for further processing in the hardware accelerator 302. In some embodiments, the hardware accelerator 302 further performs physical layer processing on the processed data. With reference to FIG. 3, only as an example, the data moving proxy 3042 writes data which is read from the first group of the plurality of buffers 3044 of the general purpose processor 304 into the second group of the plurality of buffers 3024 of the hardware accelerator 302. Only as an example, the data moving proxy 3042 writes data which is read from the downlink buffer 3044-2 of the virtual base station-1 in the first group of the plurality of buffers 3044 into the downlink buffer 3024-2 of the virtual base station-1 in the second group of the plurality of buffers 3024. Similarly, the data moving proxy 3042 writes data which is read from the downlink buffer 3044-4 of the virtual base station-2 in the first group of the plurality of buffers 3044 into the downlink buffer 3024-4 of the virtual base station-2 in the second group of the plurality of buffers 3024. The data moving proxy 3042 writes data which is read from the downlink buffer 3044-6 of the virtual base station-3 in the first group of the plurality of buffers 3044 into the downlink buffer 3024-6 of the virtual base station-3 in the second group of the plurality of buffers 3024.

As described above, FIG. 2A illustrates a block diagram of a communication device 230 according to some embodiments of the present disclosure. It should be understood that the device 230 can be implemented, for example, at the baseband processing unit 101 shown in FIG. 1. As shown, the device 230 includes the hardware accelerator 204 and the general purpose processor 214. When the device 600 is used for performing the communication method shown in FIG. 4, the hardware accelerator 204 is configured to process data to be transmitted of a plurality of virtual base stations, and the processed data is stored in the first group of a plurality of buffers in the hardware accelerator which are associated with a plurality of virtual base stations; the general purpose processor 214 is configured to: read the processed data from the first group of a plurality of buffers in a predetermined order associated with the plurality of virtual base stations; and write the processed data into the second group of a plurality of buffers in the general purpose processor to facilitate further processing.

In some embodiments, the general purpose processor 214 is further configured to: read, from the first group of the plurality of buffers, the processed data in a pooling manner.

In some embodiments, the general purpose processor 214 is further configured to: read data from a first buffer of the first group of a plurality of buffers; and in response to all data in the first buffer having been read, initiate to read data from a second buffer of the first group of a plurality of buffers, the first buffer preceding the second buffer in the predetermined sequence.

In some embodiments, the general purpose processor 214 is further configured to: read a predetermine amount of data from a third buffer of the first group of a plurality of buffers; and in response to the predetermined amount of data in the third buffer having been read, initiate to read data from a fourth buffer of the first group of a plurality of buffers, the third buffer preceding the fourth buffer in the predetermined sequence.

In some embodiments, the hardware accelerator 204 is configured to perform physical layer processing on the data to be transmitted, and the general purpose processor 214 is configured to further perform media access control processing on the processed data.

When the device 600 is used for performing the communication method shown in FIG. 5, the device 600 includes the hardware accelerator 204; and the general purpose processor 214 configured to: processing data to be transmitted of a plurality of virtual base stations, the processed data being stored in the first group of a plurality of buffers in the general purpose processor 214 which are associated with the plurality of virtual base stations; read the processed data from the first group of a plurality of buffers in a predetermined order associated with the plurality of virtual base stations; and write the processed data into the second group of a plurality of buffers in the hardware accelerator 204 for further processing of the hardware accelerator 204.

In some embodiments, the general purpose processor 214 is further configured to: read the processed data from the first group of a plurality of buffers in a pooling manner.

In some embodiments, the general purpose processor 214 is further configured to: read data from a first buffer of the first group of a plurality of buffers; and in response to all data in the first buffer having been read, initiate to read data from a second buffer of the first group of a plurality of buffers, the first buffer preceding the second buffer in the predetermined sequence.

In some embodiments, the general purpose processor 214 is further configured to: read a predetermine amount of data in a third buffer of the first group of a plurality of buffers; and in response to the predetermined amount of data in the third buffer having been read, initiate to read data from a fourth buffer of the first group of a plurality of buffers, the third buffer preceding the fourth buffer in the predetermined sequence.

In some embodiments, the general purpose processor 214 is further configured to perform media access control layer processing on the data to be transmitted, and the hardware accelerator 204 is further configured to perform physical layer processing on the processed data.

Table 1 illustrates computer program codes that can implement embodiments of the present disclosure. It should be understood that the computer program codes in Table 1 only act as examples and the scope of the present disclosure is not restricted in this regard.

TABLE 1

```
/****** buffer for uplink *******
<filesystem type='mount' accessmode='passthrough'>
        <source dir='/tmp/cell2uplink.buf'/>
        <target dir='/virtualBS-2/tmp/cell2uplink.buf'/>     // the rootfs for Linux Container-2
</filesystem>
//****** buffer for downlink******
<filesystem type='mount' accessmode='passthrough'>
        <source dir='/tmp/cell2downlink.buf'/>
        <target dir='/virtualBS-2/tmp/cell2downlink.buf'/>
</filesystem>
void *mmap(void *addr, size_t len, int prot, int flags, int fd, off_t offset);
// define the structure for uplink and downlink buffer and mutex variable
typedef struct shared_data_s_uplink
{
        char msgsha[9375];      // the buffer used to store the uplink data
        pthread_mutex_t mptr;   // the mutex variable which must be stored in the shared memory
} shared_data_t_uplink;
typedef struct shared_data_s_downlink
{
        char msgsha[18750];     // the buffer used to store the downlink data
        pthread_mutex_t mptr;
} shared_data_t_downlink;
// define pointers for uplink and downlink buffers for all the N cells
shared_data_t_uplink1 *this_data_cell1uplink;
shared_data_t_downlink1 *this_data_cell1downlink;
shared_data_t_uplink2 *this_data_cell2uplink;
shared_data_t_downlink2 *this_data_cell2downlink;
......
shared_data_t_uplinkN *this_data_cellNuplink;
shared_data_t_downlinkN *this_data_cellNdownlink;
int main( )
{
        ...
        // define the 2*N file descriptors for uplink and downlink buffers
          int fdcell1uplink, fdcell1downlink, fdcell2uplink, fdcell2downlink, ..., fdcellNuplink, fdcellNdownlink;
        // define the file descriptor for PCIe device
          int fdpcie;
        // define mutex attribute variables for all the N cells
        pthread_mutexattr_t     mattrcell1uplink;
        pthread_mutexattr_t     mattrcell1downlink;
        pthread_mutexattr_t     mattrcell2uplink;
        pthread_mutexattr_t     mattrcell2downlink;
        ...
        pthread_mutexattr_t     mattrcellNuplink;
        pthread_mutexattr_t     mattrcellNdownlink;
    // open the exposed files
        fdcell1uplink = open("/tmp/cell1uplink.buf",O_WRONLY);
    fdcell1downlink = open("/tmp/cell1downlink.buf",O_RDONLY);
    fdcell2uplink = open("/tmp/cell2uplink.buf",O_WRONLY);
    fdcell2downlink = open("/tmp/cell2downlink.buf",O_RDONLY);
    ...
    fdcellNuplink = open("/tmp/cellNuplink.buf",O_WRONLY);
    fdcellNdownlink = open("/tmp/cellNdownlink.buf",O_RDONLY);
        ...
    // create the shared memory object which has the same structure as shared_data_s
    this_data_cell1uplink = mmap(0,sizeof(shared_data_t_uplink1), PROT_WRITE,MAP_SHARED,fdcell1uplink,0);
    close(fdcell1uplink);
        this_data_cell1downlink=mmap(0,sizeof(shared_data_t_downlink1),PROT_READ,MAP_SHARED,fdcell1downlink,0)
    close(fdcell1downlink);
    this_data_cell2uplink = mmap(0,sizeof(shared_data_t_uplink2),PROT_WRITE,MAP_SHARED,fdcell2uplink,0);
    close(fdcell2uplink);
        this_data_cell2downlink=mmap(0,sizeof(shared_data_t_downlink2),PROT_READ,MAP_SHARED,fdcell2downlink,0)
    close(fdcell2downlink);
    ...
        this_data_cellNuplink = mmap(0,sizeof(shared_data_t_uplinkN), PROT_WRITE,MAP_SHARED,fdcellNuplink,0);
    close(fdcellNuplink);
        this_data_cellNdownlink=mmap(0,sizeof(shared_data_t_downlinkN),PROT_READ,MAP_SHARED,fdcellNdownlink,0)
    close(fdcellNdownlink);
    ...
```

TABLE 1-continued

```
    // initialize the mutex attribute
    pthread_mutexattr_init(&mattrcell1uplink);
pthread_mutexattr_init(&mattrcell1downlink);
pthread_mutexattr_init(&mattrcell2uplink);
pthread_mutexattr_init(&mattrcell2downlink);
...
pthread_mutexattr_init(&mattrcellNuplink);
pthread_mutexattr_init(&mattrcellNdownlink);
    // define process shared mutex
    pthread_mutexattr_setpshared(&mattrcell1uplink,PTHREAD_PROCESS_SHARED);
pthread_mutexattr_setpshared(&mattrcell1downlink,PTHREAD_PROCESS_SHARED);
pthread_mutexattr_setpshared(&mattrcell2uplink,PTHREAD_PROCESS_SHARED);
pthread_mutexattr_setpshared(&mattrcell2downlink,PTHREAD_PROCESS_SHARED);
...
pthread_mutexattr_setpshared(&mattrcellNuplink,PTHREAD_PROCESS_SHARED);
pthread_mutexattr_setpshared(&mattrcellNdownlink,PTHREAD_PROCESS_SHARED);
    // initialize the mutex
    pthread_mutex_init(&(this_data_cell1uplink->mptr),&mattrcell1uplink);
pthread_mutex_init(&(this_data_cell1downlink->mptr),&mattrcell1downlink);
pthread_mutex_init(&(this_data_cell2uplink->mptr),&mattrcell2uplink);
pthread_mutex_init(&(this_data_cell2downlink->mptr),&mattrcell2downlink);
...
pthread_mutex_init(&(this_data_cellNuplink->mptr),&mattrcellNuplink);
pthread_mutex_init(&(this_data_cellNdownlink->mptr),&mattrcellNdownlink);
    // open the PCIe device and polling the buffers
    fdpcie = Openpcie("/dev/pciex");
    while (1)
    {
        // Set the number of bytes to read and write for Cell-2
        Num_of_bytes_uplink = ;
        Num_of_bytes_downlink = ;
        // lock shared mem & enter the critical zone - uplink
        pthread_mutex_lock(&(this_data_cell1uplink->mptr));
        read(fdpcie, 1, this_data_cell1uplink, Num_of_bytes_uplink);
        ...
        // unlock the mutex & leave the critical zone
         pthread_mutex_unlock(&(this_data_cell1uplink->mptr));
         pthread_mutex_lock(&(this_data_cell1downlink->mptr));
        write(fdpcie, 1, this_data_cell1downlink, Num_of_bytes_downlink);
        pthread_mutex_unlock(&(this_data_cell1downlink->mptr));
        ...
        // Set the number of bytes to read and write for Cell-N
        Num_of_bytes_uplink = ;
        Num_of_bytes_downlink = ;
        // lock shared mem & enter the critical zone - uplink
        pthread_mutex_lock(&(this_data_cellNuplink->mptr));
        read(fdpcie, N, this_data_cellNuplink, Num_of_bytes_uplink);
        ...
        // unlock the mutex & leave the critical zone
        pthread_mutex_unlock(&(this_data_cellNuplink->mptr));
        // lock shared mem & enter the critical zone - downlink
        pthread_mutex_lock(&(this_data_cellNdownlink->mptr));
        write(fdpcie, N, this_data_cellNdownlink, Num_of bytes_downlink);
        // unlock the mutex & leave the critical zone
        pthread_mutex_unlock(&(this_data_cellNdownlink->mptr));
          ...
    }
...
    // destroy the mutex attribute
    pthread_mutexattr_destroy(&mattrcell1uplink);
//pthread_mutexattr_destroy(&mattrcell1downlink);
pthread_mutexattr_destroy(&mattrcell2uplink);
//pthread_mutexattr_destroy(&mattrcell2downlink);
...
pthread_mutexattr_destroy(&mattrcellNuplink);
//pthread_mutexattr_destroy(&mattrcellNdownlink);
    // destroy the mutex
    pthread_mutex_destroy(&(this_data_cell1uplink->mptr));
pthread_mutex_destroy(&(this_data_cell1downlink->mptr));
pthread_mutex_destroy(&(this_data_cell2uplink->mptr));
pthread_mutex_destroy(&(this_data_cell2downlink->mptr));
...
pthread_mutex_destroy(&(this_data_cellNuplink->mptr));
pthread_mutex_destroy(&(this_data_cellNdownlink->mptr));
    // remove memory-file mapping
munmap(this_data_cell1uplink, sizeof(shared_data_t_uplink1));
munmap(this_data_cell1downlink, sizeof(shared_data_t_downlink1));
munmap(this_data_cell2uplink, sizeof(shared_data_t_uplink2));
munmap(this_data_cell2downlink, sizeof(shared_data_t_downlink2));
...
```

TABLE 1-continued

```
        munmap(this_data_cellNuplink, sizeof(shared_data_t_uplinkN));
        munmap(this_data_cellNdownlink, sizeof(shared_data_t_downlinkN));
            exit(EXIT_SUCCESS);
}
Code for Container-N
// define the structure for uplink and downlink buffer and mutex variable
typedef struct shared_data_s_uplink
{
        char msgsha[9375];         // the buffer used to store the uplink data
        pthread_mutex_t mptr;      // the mutex variable which must be stored in the shared memory
} shared_data_t_uplinkN;
typedef struct shared_data_s_downlink
{
        char msgsha[18750];        pthread_mutex_t mptr;
} shared_data_t_downlinkN;
// define pointers for uplink and downlink buffers for Cell-N
shared_data_t_uplinkN *this_data_cellNuplink;
shared_data_t_downlinkN *this_data_cellNdownlink;
int main( )
{
    ...
        // define the file descriptors for uplink and downlink buffers
        int fdcellNuplink, fdcellNdownlink;
        //define mutex attribute variables for Cell-N
            pthread_mutexattr_t     mattrcellNuplink;
            pthread_mutexattr_t     mattrcellNdownlink;
        // open the exposed files
        fdcellNuplink = open("/tmp/cellNuplink.buf",O_WRONLY);
        fdcellNdownlink = open("/tmp/cellNdownlink.buf",O_RDONLY);
        ...
        // create the shared memory object which has the same structure as shared_data
        this_data_cellNuplink = mmap(0,sizeof(shared_data_t_uplinkN), PROT_WRIAE,MAP_SHARED,fdcellNuplink,0);
        close(fdcellNuplink);
            this_data_cellNdownlink=mmap(0,sizeof(shared_data_t_downlinkN),PROT_READ,MAP_SHARED,fdcellNdownlink,0)
        close(fdcellNdownlink);
        ...
        // initialize the mutex attribute
        pthread_mutexattr_init(&mattrcellNuplink);
        pthread_mutexattr_init(&mattrcellNdownlink);
            // define process shared mutex
        pthread_mutexattr_setpshared(&mattrcellNuplink,PTHREAD_PROCESS_SHARED);
        pthread_mutexattr_setpshared(&mattrcellNdownlink,PTHREAD_PROCESS_SHARED);
            // initialize the mutex
        pthread_mutex_init(&(this_data_cellNuplink->mptr),&mattrcellNuplink);
        pthread_mutex_init(&(this_data_cellNdownlink->mptr),&mattrcellNdownlink);
            // operates the uplink and downlink buffers
            while (1)
            {
              // Set the number of bytes to read and write for Cell-N
              Num_of_bytes_uplink = ;
              Num_of_bytes_downlink = ;
              // lock shared mem & enter the critical zone - uplink
              pthread_mutex_lock(&(this_data_cellNuplink->mptr));
              );
               // operations on the uplink buffer
              ...
               // unlock the mutex & leave the critical zone
      pthread_mutex_unlock(&(this_data_cellNuplink->mptr));
              // lock shared mem & enter the critical zone - downlink
              pthread_mutex_lock(&(this_data_cellNdownlink->mptr));
                     ...
              // unlock the mutex & leave the critical zone
              pthread_mutex_unlock(&(this_data_cellNdownlink->mptr));
              ...
            }
            ...
            // destroy the mutex attribute
        pthread_mutexattr_destroy(&mattrcellNuplink);
        pthread_mutexattr_destroy(&mattrcellNdownlink);
            // destroy the mutex
        pthread_mutex_destroy(&(this_data_cellNuplink->mptr));
        pthread_mutex_destroy(&(this_data_cellNdownlink->mptr));
            // remove memory-file mapping
        munmap(this_data_cellNuplink, sizeof(shared_data_t_uplinkN));
        munmap(this_data_cellNdownlink, sizeof(shared_data_t_downlinkN));
        exit(EXIT_SUCCESS);
```

Generally speaking, various example embodiments of the present disclosure can be implemented in hardware, dedicated circuits, software, logic or any combinations thereof. Some aspect can be implemented in hardware while other aspects can be implemented in firmware or software executed by controllers, microprocessors or other computing devices. When each aspect of embodiments of the present disclosure is illustrated or described as block diagram and flowchart or represented by some other graphics, it should be understood that the block, apparatus, system, technology or method described here can be implemented in hardware, software, firmware, dedicate circuits, logic, general-purpose hardware, controller, or other computing devices, or any other combinations thereof as non-restrictive examples.

As an example, embodiments of the present disclosure can be described in the context of machine-executable instructions, which is comprised in program modules executed in devices on a target physical or virtual processor for example. In general, program modules comprise routines, programs, libraries, objects, classes, components, data architecture etc. and execute particular tasks or implement particular abstract data structure. In each embodiment, functions of the program module can be merged or divided between the described program modules and the machine-executable instructions for program modules can be executed in local or distributed devices. In the distributed devices, program modules can be positioned in local and remote storage media.

The computer program codes for implementing method of the present disclosure can be written in one of more kinds of programming languages. The computer program codes can be provided to processors of the general-purpose computer, dedicated computer or other programmable data processing apparatuses, such that the program codes, when executed by the computer or other programmable data processing apparatuses, cause the implementation of functions/operations specified in the flowchart and/or block diagram. The program codes can be executed entirely on the computer, partially on the computer, as an independent software package, partially on the computer and partially on the remote computer or entirely on the remote computer or server.

In the context of the present disclosure, machine-readable medium can be any tangible medium that comprises or stores programs for or related to an instruction executing system, apparatus or device. The machine-readable medium can be machine-readable signal medium or machine-readable storage medium and can comprise but not limited to electronic, magnetic, optical, electromagnetic, infrared semiconductor system, apparatus or device, or any suitable combinations thereof. The more specific examples of the machine-readable storage medium comprise an electrical connection including one or more wires, a portable computer disk, a hard disk, a random-access memory (RAM), a read-only memory (ROM), an erasable programmable read-only memory (EPROM or flash), an optical storage device, a magnetic storage device, or any suitable combinations thereof.

Furthermore, although the operations are depicted in a particular order, it should be appreciated that the operations are not required to be completed in the particular order or in succession, or not all operations shown in the drawings need to be executed to obtain the expected result. In some cases, multitasking or multiprocessing is also beneficial. Likewise, although the above discussion comprises some particular implementation details, they should not be interpreted as limiting the scope of the invention or claims. On the contrary, they should be appreciated as description for particular embodiments of the particular invention. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter has been described in languages specific to structural features and/or method actions, it should be understood that the subject matter defined in the attached claims is not limited to the above described particular features or actions. On the contrary, the above described specific features and actions are disclosed for implementing examples of the claims.

I claim:

1. A method implemented at a baseband processing unit having a plurality of virtual base stations arranged thereon, the method comprising:
    enabling a hardware accelerator in the baseband processing unit to process data to be transmitted in the plurality of virtual base stations, the processed data being stored in a first group of a plurality of buffers in the hardware accelerator which are associated with the plurality of virtual base stations;
    reading, from the first group of the plurality of buffers, the processed data in a predetermined order associated with the plurality of virtual base stations; and
    writing the processed data into a second group of a plurality of buffers in a general purpose processor of the baseband processing unit for further processing in the general purpose processor.

2. The method of claim 1, wherein reading, from the first group of the plurality of buffers, the processed data in a predetermined order associated with the plurality of virtual base stations comprises:
    reading, from the first group of the plurality of buffers, the processed data in a pooling manner.

3. The method of claim 1, wherein reading, from the first group of the plurality of buffers, the processed data in a predetermined order associated with the plurality of virtual base stations comprises:
    reading data from a first buffer of the first group of the plurality of buffers; and
    in response to all of the data in the first buffer having been read, initiating reading of data from a second buffer of the first group of the plurality of buffers, the first buffer preceding the second buffer in the predetermined order.

4. The method of claim 1, wherein reading, from the first group of the plurality of buffers, the processed data in a predetermined order associated with the plurality of virtual base stations comprises:
    reading a predetermined amount of data from a third buffer of the first group of the plurality of buffers; and
    in response to the predetermined amount of data in the third buffer having been read, initiating reading of data from a fourth buffer of the first group of the plurality of buffers, the third buffer preceding the fourth buffer in the predetermined order.

5. The method of claim 1, wherein the hardware accelerator performs physical layer processing on the data to be transmitted, and the general purpose processor further performs media control access layer processing on the processed data.

6. The method of claim 1, wherein the hardware accelerator is a field programmable gate array (FPGA), and the general purpose processor is a central processor.

7. A method implemented at a baseband processing unit on having a plurality of virtual base stations arranged thereon, the method comprising:
- enabling a general purpose processor in the baseband processing unit to process data to be transmitted in the plurality of virtual base stations, the processed data being stored in a first group of a plurality of buffers in the general purpose processor which are associated with the plurality of virtual base stations;
- reading, from the first group of the plurality of buffers, the processed data in a predetermined order associated with the plurality of virtual base stations; and
- writing the processed data into a second group of a plurality of buffers in a hardware accelerator of the baseband processing unit for further processing in the hardware accelerator.

8. The method of claim 7, wherein reading the processed data from the first group of the plurality of buffers in a predetermined order associated with the plurality of virtual base stations comprises:
- reading, from the first group of the plurality of buffers, the processed data in a pooling manner.

9. The method of claim 7, wherein reading, from the first group of the plurality of buffers, the processed data in a predetermined order associated with the plurality of virtual base stations comprises:
- reading data from a first buffer of the first group of the plurality of buffers; and
- in response to all of the data in the first buffer having been read, initiating reading of data from a second buffer of the first group of the plurality of buffers, the first buffer preceding the second buffer in the predetermined order.

10. The method of claim 7, wherein reading, from the first group of the plurality of buffers, the processed data in a predetermined order associated with the plurality of virtual base stations comprises:
- reading a predetermined amount of data from a third buffer of the first group of the plurality of buffers; and
- in response to the predetermined amount of data in the third buffer having been read, initiating reading of data from a fourth buffer of the first group of the plurality of buffers, the third buffer preceding the fourth buffer in the predetermined order.

11. The method of claim 7, wherein the general purpose processor performs media control access layer processing on the data to be transmitted, and the hardware accelerator further performs physical layer processing on the processed data.

12. The method of claim 7, wherein the hardware accelerator is a field programmable gate array (FPGA), and the general purpose processor is a central processor.

13. A communication device having a plurality of virtual base stations arranged thereon, the communication device comprising:
- a hardware accelerator configured to process data to be transmitted in the plurality of virtual base stations, the processed data being stored in a first group of a plurality of buffers in the hardware accelerator which are associated with the plurality of virtual base stations; and
- a general purpose processor configured to:
  - read, from the first group of the plurality of buffers, the processed data in a predetermined order associated with the plurality of virtual base stations; and
  - write the processed data into a second group of a plurality of buffers in the general purpose processor for further processing.

14. The device of claim 13, wherein the general purpose processor is further configured to:
- read data from a first buffer of the first group of the plurality of buffers; and
- in response to all of the data in the first buffer having been read, initiate reading of data from a second buffer of the first group of the plurality of buffers, the first buffer preceding the second buffer in the predetermined order.

15. A communication device having a plurality of virtual base stations arranged thereon, the communication device comprising:
- a hardware accelerator;
- a general purpose processor configured to:
  - process data to be transmitted in the plurality of virtual base stations, the processed data being stored in a first group of a plurality of buffers in the general purpose processor which are associated with the plurality of virtual base stations;
  - read, from the first group of the plurality of buffers, the processed data in a predetermined order associated with the plurality of virtual base stations; and
  - write the processed data into a second group of a plurality of buffers in the hardware accelerator for further processing in the hardware accelerator.

* * * * *